United States Patent
Olsson

(10) Patent No.: US 12,046,832 B2
(45) Date of Patent: Jul. 23, 2024

(54) PHASE ARRAY ANTENNA RADIOS OPTIMIZED FOR INDOOR COMMUNICATION

(71) Applicant: Telefonaktiebolaget LM Ericsson (publ), Stockholm (SE)

(72) Inventor: Bengt-Erik Olsson, Hovås (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 99 days.

(21) Appl. No.: 17/638,439

(22) PCT Filed: Aug. 26, 2020

(86) PCT No.: PCT/IB2020/057966
§ 371 (c)(1),
(2) Date: Feb. 25, 2022

(87) PCT Pub. No.: WO2021/038459
PCT Pub. Date: Mar. 4, 2021

(65) Prior Publication Data
US 2022/0352628 A1    Nov. 3, 2022

Related U.S. Application Data

(60) Provisional application No. 62/892,250, filed on Aug. 27, 2019.

(51) Int. Cl.
    *H01Q 3/36*      (2006.01)
    *H01Q 1/24*      (2006.01)
    *H04B 7/0413*    (2017.01)

(52) U.S. Cl.
    CPC .............. *H01Q 3/36* (2013.01); *H01Q 1/246* (2013.01); *H04B 7/0413* (2013.01)

(58) Field of Classification Search
    CPC ........ H01Q 3/36; H01Q 1/246; H04B 7/0413; H04B 7/06
See application file for complete search history.

(56) References Cited

U.S. PATENT DOCUMENTS

| | | | |
|---|---|---|---|
| 2004/0027284 A1 | 2/2004 | Leeper et al. | |
| 2014/0235287 A1* | 8/2014 | Maltsev | H04W 52/367 455/522 |

(Continued)

OTHER PUBLICATIONS

International Search Report and Written Opinion for International Patent Application No. PCT/IB2020/057966, mailed Oct. 28, 2020, 12 pages.

*Primary Examiner* — Dac V Ha
(74) *Attorney, Agent, or Firm* — Sage Patent Group

(57) ABSTRACT

Embodiments of antenna systems and radio nodes incorporating the antenna systems are disclosed herein. In one embodiment, a radio access node for a cellular communications system comprises one or more antenna systems comprising a first antenna system directed at a desired bore sight angle. The one or more antenna systems further comprise either or both of a second antenna system directed upwards relative to the desired bore sight angle of the first antenna system and a second antenna system directed downwards relative to the desired bore sign angle of the first antenna system. In this manner, the radio access is optimized for an indoor environment because it can add Single User Multiple Input Multiple Output (SU-MIMO) channels by utilizing reflections from the ceiling and floor in the indoor environment.

12 Claims, 10 Drawing Sheets

(56) References Cited

U.S. PATENT DOCUMENTS

| | | | |
|---|---|---|---|
| 2017/0163327 A1* | 6/2017 | Yang | H04B 7/086 |
| 2017/0311307 A1* | 10/2017 | Negus | H01Q 21/24 |
| 2018/0227928 A1 | 8/2018 | Kim et al. | |
| 2018/0301801 A1* | 10/2018 | Hojjat | H01Q 9/16 |

* cited by examiner

*Available RF paths between an RBS and a user terminal in a room*

Measured power in an indoor location resolved in horizontal (x-axis) and vertical (y-axis)

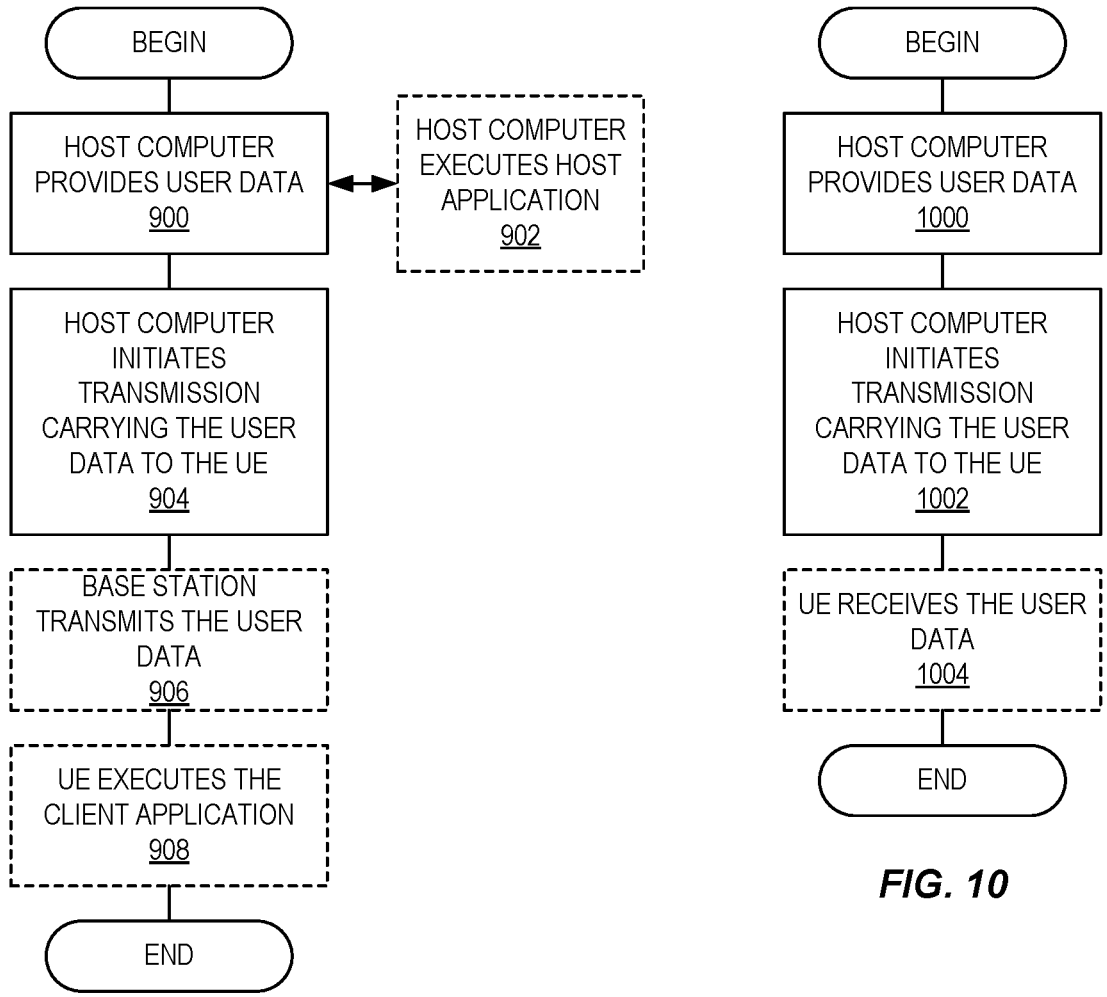

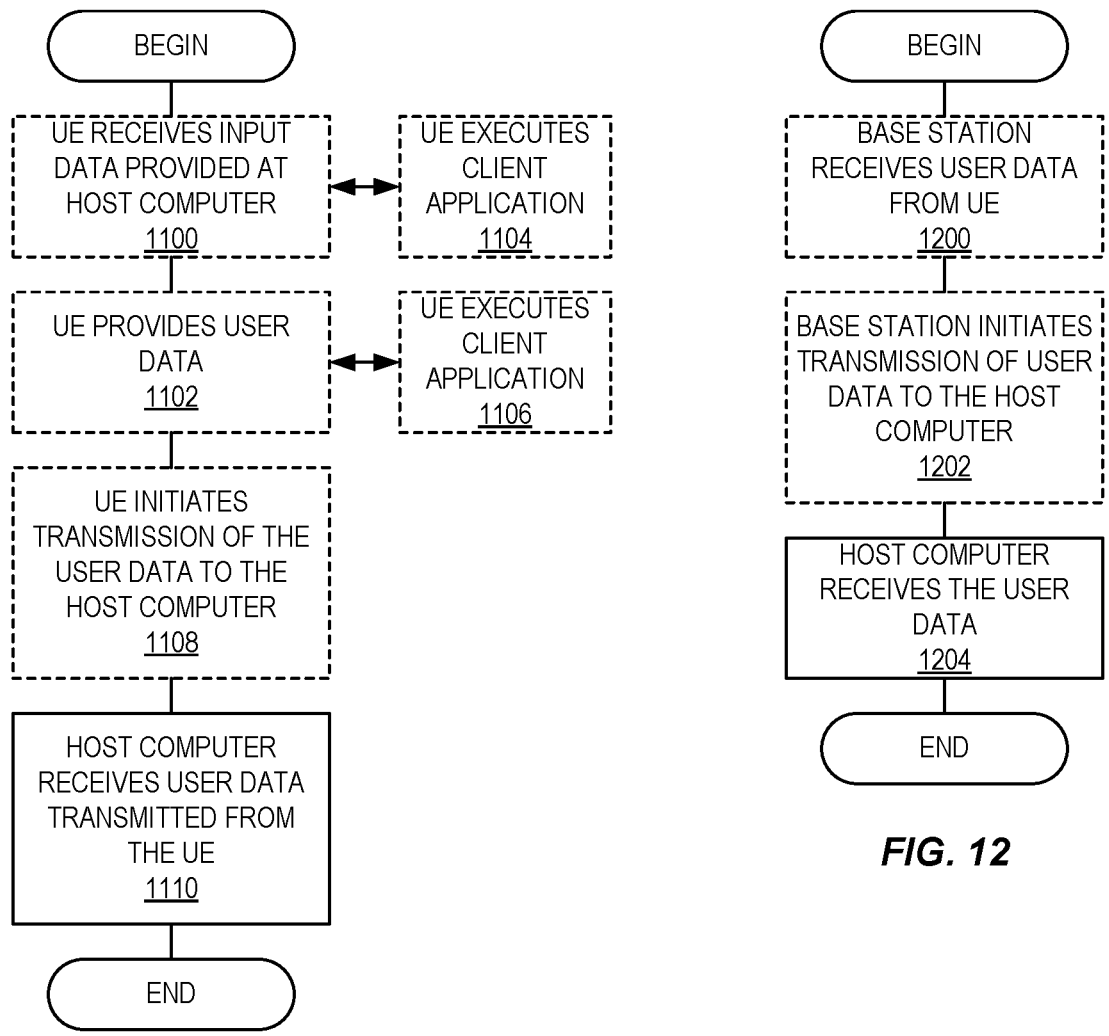

PHASE ARRAY ANTENNA RADIOS OPTIMIZED FOR INDOOR COMMUNICATION

RELATED APPLICATIONS

This application is a 35 U.S.C. § 371 national phase filing of International Application No. PCT/IB2020/057966, filed Aug. 26, 2020, which claims the benefit of provisional patent application Ser. No. 62/892,250, filed Aug. 27, 2019, the disclosures of which are hereby incorporated herein by reference in their entireties.

TECHNICAL FIELD

The present disclosure relates to a radio base station for a wireless network and, in particular, to a radio base station including a phased array antenna.

BACKGROUND

In next generation mobile access systems such as Fifth Generation (5G) New Radio (NR), the radio base stations (RBS) will utilize advanced antenna systems that allow steerable narrow antenna beams for communications with the user equipments (UEs). Especially for systems operating at microwave frequencies e.g. >20 Gigahertz (GHz) and even beyond 100 GHz, such antenna beams can be extremely narrow and thus provide very high antenna gains. By using phase array antenna modules (PAAMs) in the radio unit, the narrow beam can be directed to target a UE in a specific location and follow the UE as it is moving. Each block of user data can be associated with an antenna beam that optimizes the communication with the particular UE. This is contrary to earlier systems where the RBS used a single wide beam antenna for all UEs located within in the radio cell.

The PAAM includes many antenna elements (i.e. small wide beam antennas) for which the transmit and receive signals are adjusted in phase and amplitude such that the combined electrical field from all antenna elements constitutes a desired antenna beam pattern. At microwave frequencies, the antenna elements become reasonably small, e.g. a few millimeters in diameter, and thus many elements can be included in a cost efficient PAAM. Current PAAMs for 5G radios operating at 20-40 GHz contain several hundreds of antenna elements allowing user beams that are less than 10° wide, and each antenna element can simultaneously operate on both horizontal and vertical polarization.

Ideally, there could be a single radio transmitter/receiver with a digital interface for each antenna element that would allow full digital control of the antenna pattern in real time. Such solution would allow the use of multiple-input-multiple-output (MIMO) technologies for either increased throughput to each UE (using so called single user MIMO (SU-MIMO)) or allow simultaneous communication with multiple users (using so called multiple user MIMO (MU-MIMO)). However, at microwave frequencies, the large signal bandwidth, which can be in the order of multiple GHz, and large number of antenna elements makes in practically difficult to build such an interface that connects the baseband processor to each antenna element. Instead, the entire PAAM, or groups of antenna elements inside the PAAM, are served by the same transmit/receive signals that are routed to all antenna elements and only the amplitude and phase of the signal is controlled for each antenna element. This allows for flexible beams that can be switched with very high speed.

Sometimes a radio unit can include multiple PAAMs or sections of antenna elements within a PAAM that can operate in MIMO configuration. Most current 5G radios also support individual control of the two polarization channels supported by the PAAM, doubling the capacity for each UE or allowing communication with two UEs at the same time. In the discussion below, all references to MIMO technologies assume spatial MIMO and not polarization-based MIMO.

In order for SU-MIMO to be effective, there must exist multiple propagation paths between the RBS antennas, PAAMs, and the UE. If only one strong path is present, e.g. the line-of-sight (LOS) path, SU-MIMO will not provide any additional channel capacity. On the other hand, if there are e.g. four different paths that are independent/orthogonal, SU-MIMO could enable four times higher throughput to that UE. Thus, there is not much benefit from controlling the signal individually to each antenna element. Instead, SU-MIMO and of course also MU-MIMO is more efficiently implemented by adding a few more PAAMs that carry independent signals to/from the baseband processor. In many cases, having e.g. four PAAMs that are independently controlled by a common baseband processor would be a great compromise between complexity/cost and potential SU-MIMO and MU-MIMO capabilities. Such a system could serve four UEs simultaneously in the same frequency band or provide four times increase in the throughput to one UE at a time.

Reflection from obstacles in the environment can provide multiple propagation paths, especially in indoor environments. But, as mentioned above, it is rare to find equally strong multiple propagation paths when there is LOS between transmitter and receiver. Reasonably equal loss between the available paths is also required for SU-MIMO to be efficient. However, when there is non-line of sight (NLOS), there are better chances for multiple paths with similar path loss to occur. The challenge is now to understand how these multiple paths occur in the environment and subsequently how to design a PAAM or PAAM system that best utilizes the available propagation paths.

There currently exist certain challenge(s). The PAAMs that exist today can usually cover a fairly limited directional area, i.e. serving a limited sector with narrow beams. A typical sector could be 120° horizontally and 30° vertically, often with a little worse beam quality for beams far away from bore sight. In many indoor environments, multiple such PAAMs mounted next to each other will not be able to utilize available paths that exist outside the PAAM sector. Thus, the concept of adding multiple PAAMs covering the same sector for SU-MIMO does not work as each PAAM must communicate with the UE using different propagation paths.

SUMMARY

Embodiments of antenna systems and radio nodes incorporating the antenna systems are disclosed herein. In one embodiment, a radio access node for a cellular communications system comprises one or more antenna systems comprising a first antenna system directed at a desired bore sight angle. The one or more antenna systems further comprise either or both of a second antenna system directed upwards relative to the desired bore sight angle of the first antenna system and a second antenna system directed downwards relative to the desired bore sign angle of the first antenna system. In this manner, the radio access is optimized for an indoor environment because it can add Single User Multiple Input Multiple Output (SU-MIMO) channels by utilizing reflections from the ceiling and floor in the indoor environment.

In one embodiment, the radio access node further comprises one or more processing units configured to control the one or more antenna systems in accordance with a Multiple Input Multiple Output (MIMO) scheme.

In one embodiment, the radio access node further comprises one or more processing units configured to control the one or more antenna systems in accordance with a SU-MIMO scheme.

In one embodiment, each antenna system of the one or more antenna systems comprises a respective antenna array comprising a plurality of antenna elements.

In one embodiment, the one or more antenna systems comprise the second antenna system, and the second antenna system s directed upwards at an angle in a range of and including 10° to 80°, relative to the desired bore sight angle of the first antenna system. In another embodiment, the one or more antenna systems comprise the second antenna system, and the second antenna system is directed upwards at an angle in a range of and including 20° to 70°, relative to the desired bore sight angle of the first antenna system. In another embodiment, the one or more antenna systems comprise the second antenna system, and the second antenna system is directed upwards at an angle in a range of and including 30° to 60°, relative to the desired bore sight angle of the first antenna system. In another embodiment, the one or more antenna systems comprise the second antenna system, and the second antenna system is directed upwards at an angle in a range of and including 40° to 50°, relative to the desired bore sight angle of the first antenna system.

In one embodiment, the one or more antenna systems comprise the third antenna system, and the third antenna system is directed downwards at an angle in a range of and including −10° to −80°, relative to the desired bore sight angle of the first antenna system. In another embodiment, the one or more antenna systems comprise the third antenna system, and the third antenna system is directed downwards at an angle in a range of and including −20° to −70°, relative to the desired bore sight angle of the first antenna system. In another embodiment, the one or more antenna systems comprise the third antenna system, and the third antenna system is directed downwards at an angle in a range of and including −30° to −60°, relative to the desired bore sight angle of the first antenna system. In another embodiment, the one or more antenna systems comprise the third antenna system, and the third antenna system is directed downwards at an angle in a range of and including −40° to −50°, relative to the desired bore sight angle of the first antenna system.

In one embodiment, the radio access node is an indoor radio access node.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 9 through 12 are flow charts that illustrate methods that may be implanted in the system of FIG. 7 in accordance with some embodiments of the present disclosure.

DETAILED DESCRIPTION

Figure 1:
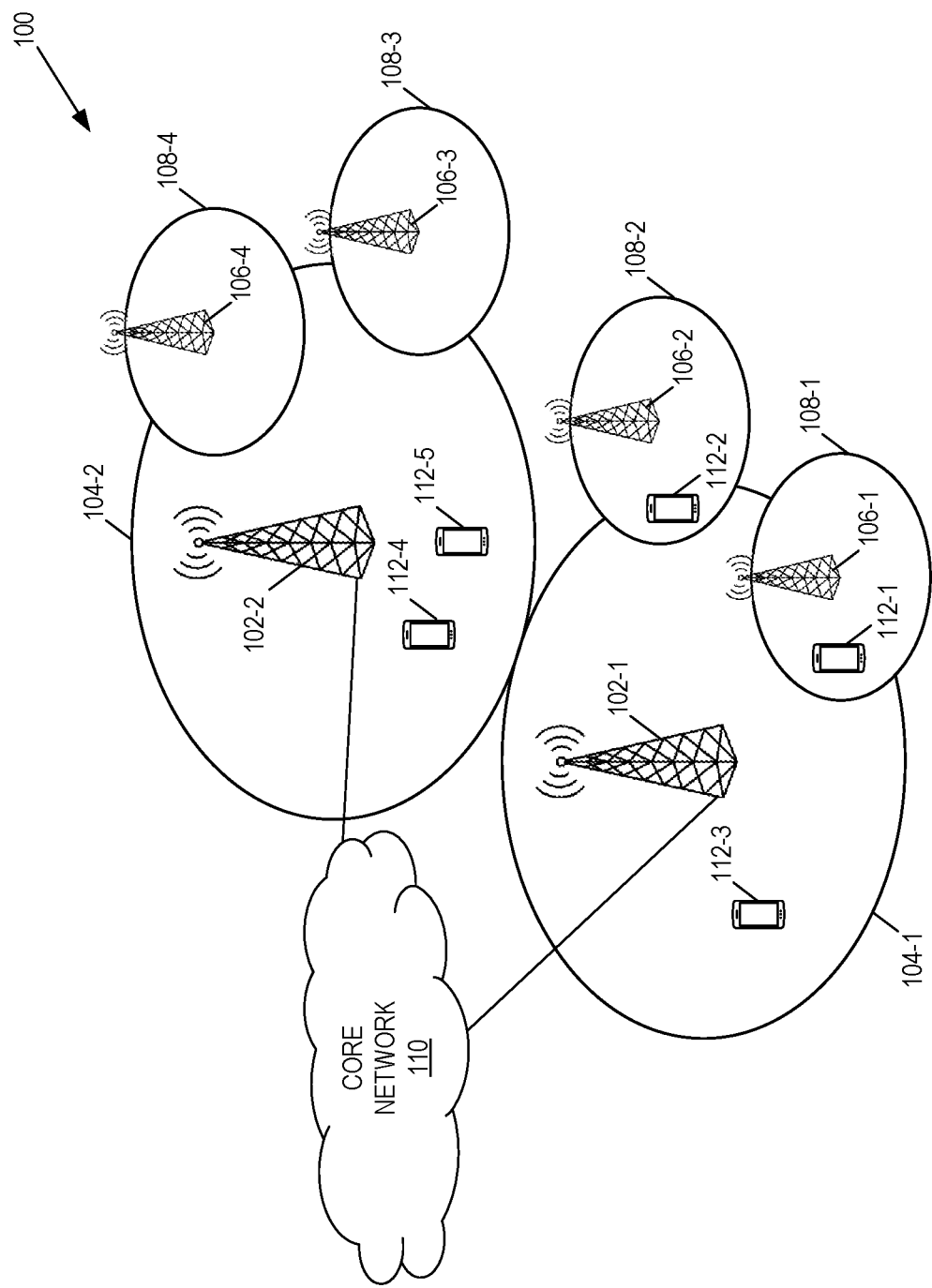
FIG. 1 illustrates one example of a cellular communications system in which embodiments of the present disclosure may be implemented.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node. Note that that a base station is also referred to herein as a radio base station (RBS).

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing a Access and Mobility Function (AMF), a UPF, a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Certain aspects of the present disclosure and their embodiments may provide solutions to the aforementioned or other challenges associated with conventional Phase Array Antenna Modules (PAAMs). As will be shown below, paths reflected in the ceiling offers a reliable propagation path to most locations in indoor environments. In larger venues such as airports and shopping centers, reflections also from the floor, possibly after a second reflection in the roof, offer an orthogonal path to the Line of Sight (LOS) path or reflection in the horizontal plane between transmitter and receiver. Embodiments of an arrangement of PAAMs in a radio base station (RBS) that specifically target roof reflections and floor reflections in addition to paths offered by the bore sight PAAM are disclosed herein.

In some embodiments, a limited number of PAAMs are added for an RBS, where these PAAMs are mounted in directions where additional paths are likely to be available such as direction towards a roof (i.e., a ceiling), directions towards a floor, or both directions toward a roof and directions towards a floor. This way, the resilience to obstacles blocking LOS and other paths close to bore sight can be utilized. This also provides a cost-efficient way to add Multiple Input Multiple Output (MIMO) capabilities to millimeter wave (mm-wave) radios when the added PAAMs are used in a MIMO configuration with the conventional bore sight PAAM.

Certain embodiments may provide one or more of the following technical advantage(s). Embodiments of the present disclosure can add Single User MIMO (SU-MIMO) channels by utilizing reflections in the roof and floor in an indoor environment. In one embodiment, a second PAAM is added and is tilted upwards to cover the entire ceiling in the coverage area of interest. Such solution would significantly increase the throughput to UEs in the area.

FIG. 1 illustrates one example of a cellular communications system 100 in which embodiments of the present disclosure may be implemented. In the embodiments described herein, the cellular communications system 100 is a 5G system (5GS) including a NR RAN. However, the 5GS is only an example. Embodiments disclosed herein may be utilized in any type of wireless communication system that utilizes SU-MIMO. In this example, the RAN includes base stations 102-1 and 102-2, which in 5G NR are referred to as gNBs, controlling corresponding (macro) cells 104-1 and 104-2. The base stations 102-1 and 102-2 are generally referred to herein collectively as base stations 102 and individually as base station 102. Likewise, the (macro) cells 104-1 and 104-2 are generally referred to herein collectively as (macro) cells 104 and individually as (macro) cell 104. The RAN may also include a number of low power nodes 106-1 through 106-4 controlling corresponding small cells 108-1 through 108-4. The low power nodes 106-1 through 106-4 can be small base stations (such as pico or femto base stations) or Remote Radio Heads (RRHs), or the like. Notably, while not illustrated, one or more of the small cells 108-1 through 108-4 may alternatively be provided by the base stations 102. The low power nodes 106-1 through 106-4 are generally referred to herein collectively as low power nodes 106 and individually as low power node 106. Likewise, the small cells 108-1 through 108-4 are generally referred to herein collectively as small cells 108 and individually as small cell 108. The cellular communications system 100 also includes a core network 110, which in the 5GS is referred to as the 5G core (5GC). The base stations 102 (and optionally the low power nodes 106) are connected to the core network 110.

The base stations 102 and the low power nodes 106 provide service to wireless devices 112-1 through 112-5 in the corresponding cells 104 and 108. The wireless devices 112-1 through 112-5 are generally referred to herein collectively as wireless devices 112 and individually as wireless device 112. The wireless devices 112 are also sometimes referred to herein as UEs.

In the embodiments described herein, at least some of the base stations 102 and/or at least some of the low power nodes 106 are located in an indoor environment and are therefore referred to herein as "indoor radio access nodes". Further, these indoor radio access nodes include at least two PAAMs including a PAAM that is directed towards a ceiling of the indoor environment, a PAAM that is directed towards a floor of the indoor environment, or both a PAAM that is directed towards the ceiling of the indoor environment and a PAAM that is directed towards the floor of the indoor environment, as discussed below in detail.

Figure 2:
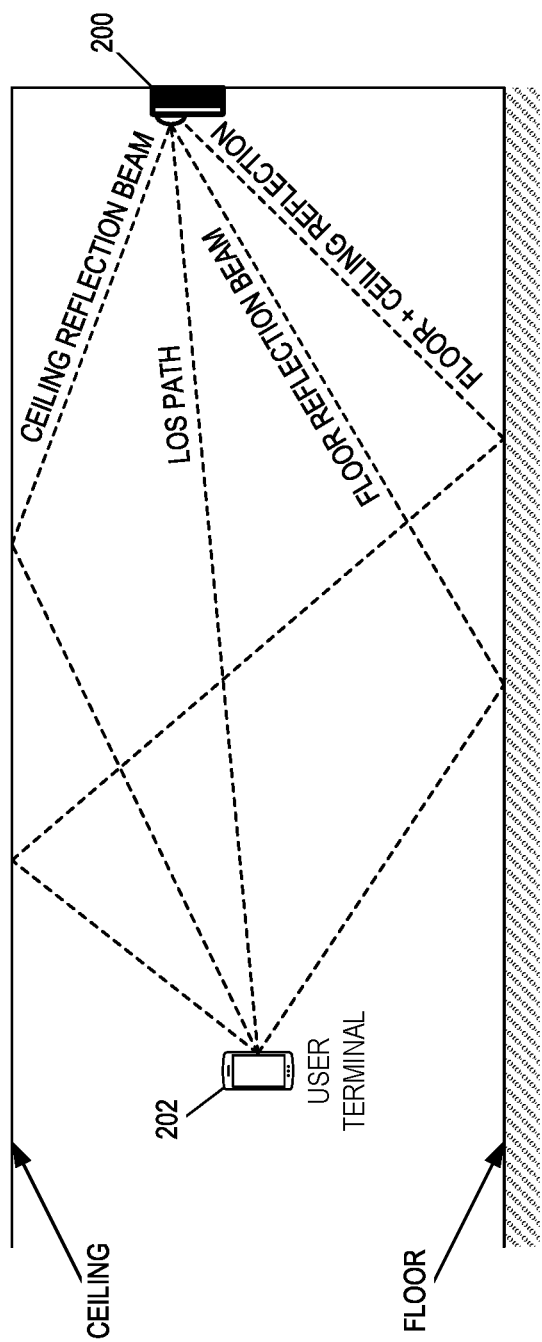
FIG. 2 illustrates some available Radio Frequency (RF) propagation paths between a radio base station (RBS) and user equipment (UE) in a clean, indoor room.

FIG. 2 shows schematically some available paths (i.e., radio frequency (RF) propagation paths) between an RBS 200 (e.g., a base station 102 or a low power node 106) and a UE 202 (e.g., a UE 112) in a clean indoor room. In addition to the LOS path, there are paths arising from reflections from the ceiling and from the floor. Note that the angles on both sides of the normal to the surface are equal and that therefore only one reflection point exists on a flat surface. However, uneven surfaces and objects on the ceiling or on the floor may create additional paths. In a cluttered environment such as a home or office, some paths may be blocked but others can exist due to reflections from objects. The existence of multiple paths greatly improves the stability of the communication link if utilized in a proper way.

Figure 3:
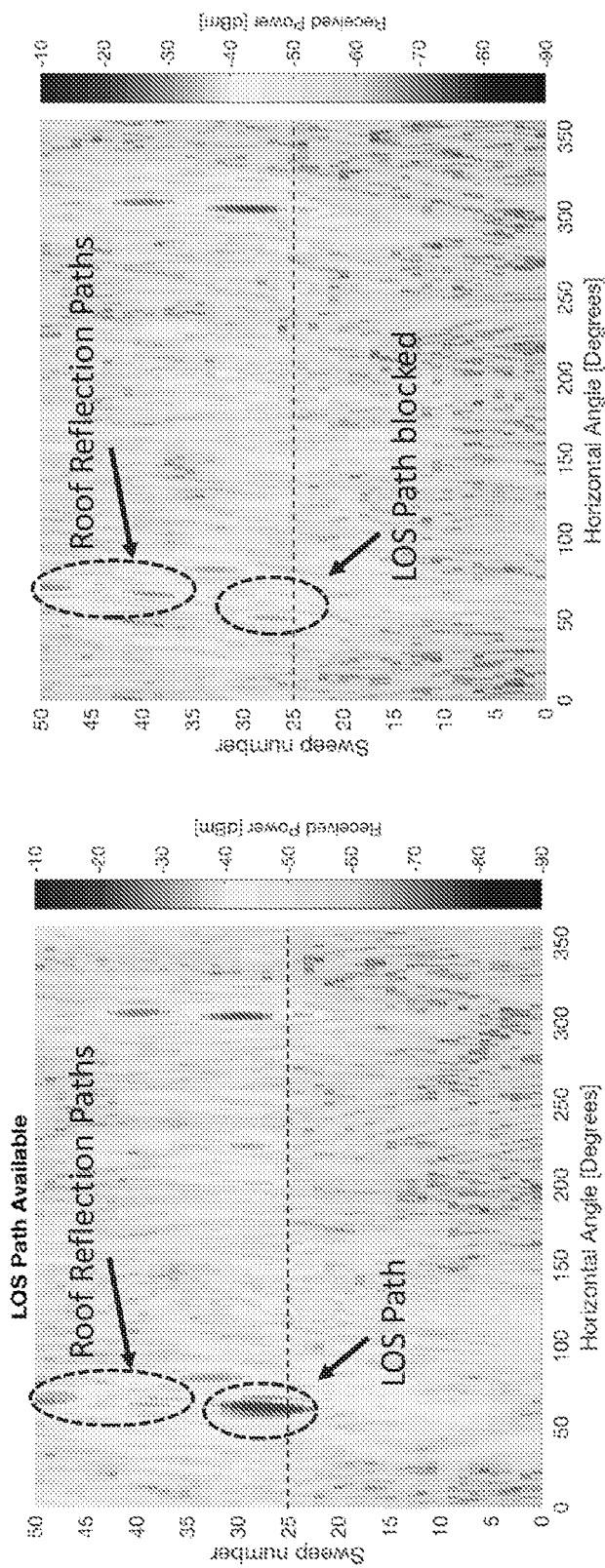
FIG. 3 shows measured power in an indoor office location approximately 25 meters from the transmitter with 0°-360° horizontal direction on the x-axis, and vertical (y-axis) steps of 1 degree sweeping from −25° to +25°.

FIG. 3 shows measured power in an indoor office location approximately 25 meters from the transmitter with 0°-360° horizontal direction on the x-axis, and vertical (y-axis) steps of 1 degree sweeping from −25° to +25°. Horizontal bore sight corresponds to sweep 25 in FIG. 3. The left chart in FIG. 3 shows the LOS path clearly visible and, a few degrees above, reflections from the ceiling are also clearly visible. The right chart in FIG. 3 shows the same environment with the LOS path blocked by a screen to emulate the case where LOS is not present. However, the reflected path from the ceiling is still there. Thus, the reflected path from the roof is very valuable, and the radio must have an antenna system that supports communication on this path. In this environment, paths reflected off the floor are not clearly visible even though they could potentially enable a second reflection off the roof.

As outlined above, in some embodiments, an indoor radio access node (e.g., an RBS implemented in an indoor environment) includes a separate PAAM mounted such that this separate PAAM can provide beams that communicate with UE by means of reflection from the ceiling. Note that this PAAM still supports many beams in different directions in order to communicate with UEs in different locations since the actual reflection point will vary with user location.

Figure 4:
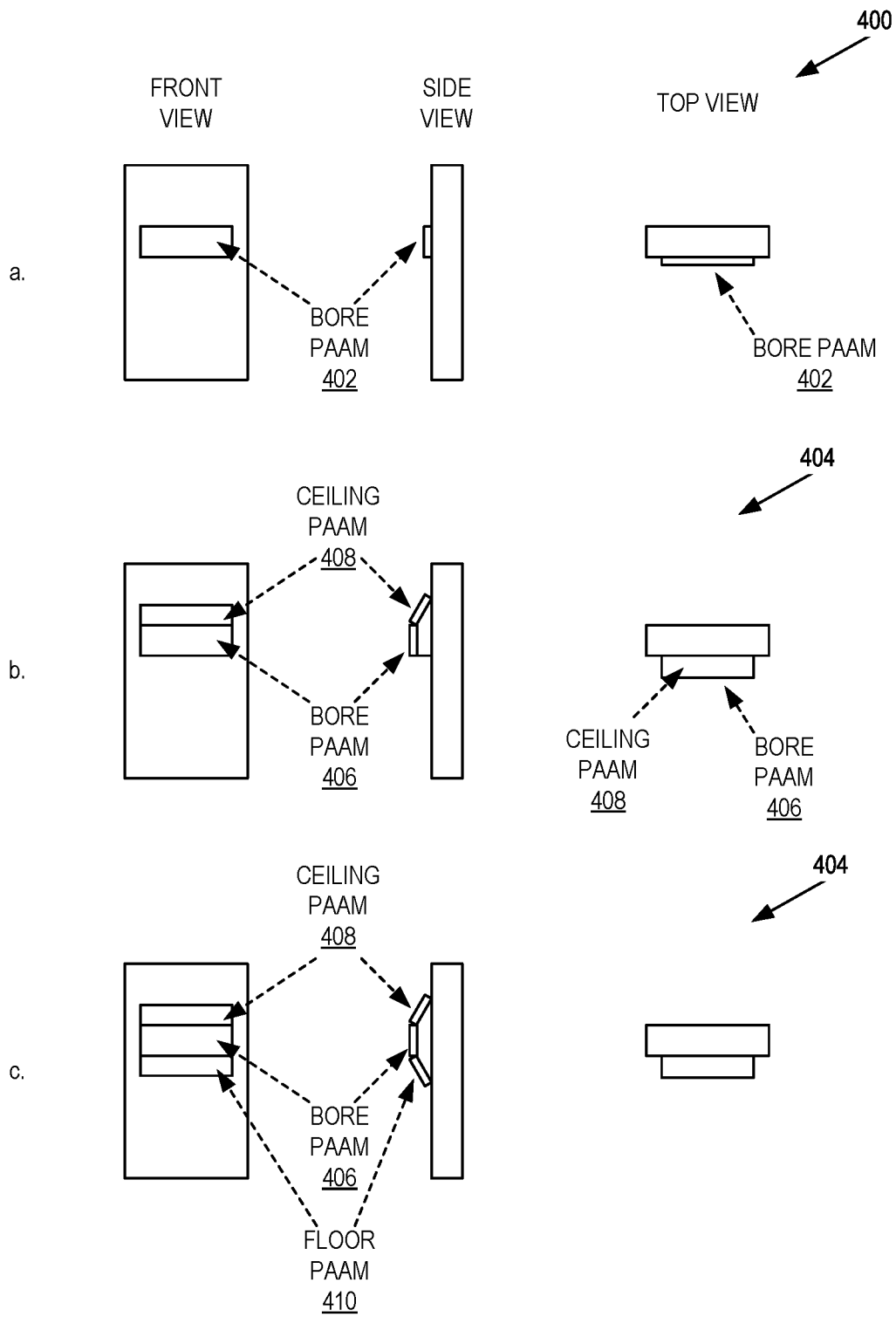
FIG. 4 shows some examples of an RBS with various Phase Array Antenna Module (PAAM) configurations, including an additional PAAM(s) for utilizing reflections from the ceiling and/or reflections from the floor in accordance with embodiments of the present disclosure.

FIG. 4 shows some examples of an RBS with various PAAM configurations, including an additional PAAM(s) for utilizing reflections from the ceiling and/or reflections from the floor. Note that while the discussion of FIG. 4 focuses on PAAM configurations for an RBS, this discussion is equally applicable to any type of indoor radio access node. FIG. 4(*a*) shows a typical PAAM based RBS 400 with a PAAM 402 (referred to herein as a "bore PAAM") mounted flat on the bore sight of the radio. Using conventional technology, the bore PAAM 402 cannot cover angles large enough to fully utilize paths reflected off the ceiling but instead supports paths close to LOS between the RBS 400 and the UE. If the LOS path is blocked, reflections off walls or objects near the UE can possibly provide a useful path. FIG. 4(*b*) shows an RBS 404 with a bore PAAM 406 and an additional PAAM 408 (referred to herein as a "ceiling PAAM") mounted with an angle facing the ceiling. Since the ceiling is likely to provide a path also when the LOS path is blocked, this arrangement provides an additional communication path than can be used to enhance the coverage and capacity of the link. If the ceiling PAAM 408 is provided with a separate digital interface to the baseband processor, it can also ideally double the throughput to the UE by adding an additional communication channel. FIG. 4(*c*) shows another embodiment of the RBS 404 with yet an additional PAAM 410 (referred to herein as a "floor PAAM") in order to utilize reflections off the floor or objects on the floor. The floor PAAM 410 can in the same way as discussed for the ceiling PAAM 408 above, add stability and performance increase by allow use of additional paths originating from the floor.

Figure 5:
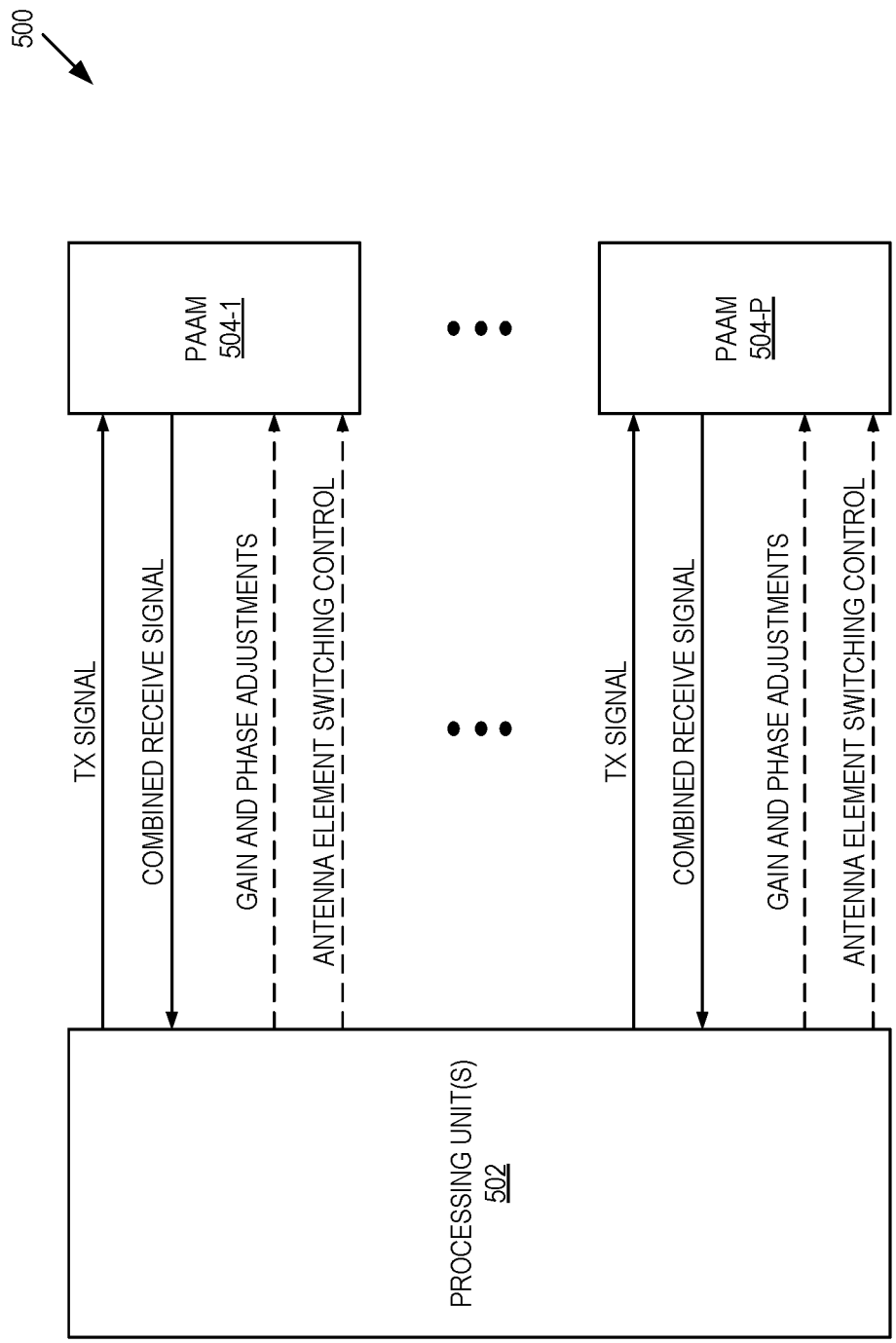
FIG. 5 shows an example embodiment of a radio access node (e.g., an RBS) having a PAAM configuration in accordance with embodiments of the present disclosure.

FIG. 5 shows an example embodiment of a radio access node 500 having a PAAM configuration in accordance with embodiments of the present disclosure. The radio access node 500 may be, e.g., a base station 102 or a low power node 106. Further, the radio access node 500 is preferably an indoor radio access node 500. The radio access node 500 performs beamforming via an antenna array. This beamforming may be, e.g., analog beamforming, which is performed by controlling gain and phase for each antenna branch via respective gain and phase control elements. However, it should be appreciated that, in some other embodiments, the radio access node 500 may perform, e.g., hybrid beamforming, i.e., perform beamforming partly in the digital domain and partly in the analog domain or may perform digital beamforming (i.e., beamforming fully in the digital domain).

As illustrated, the radio access node 500 includes a processing unit 502 and a number of Phased Antenna Array Module (PAAMs) 504-1 through 504-P. In this example, the PAAMs include a first PAAM 504-1 directed at a desired bore sight angle and either or both of: (a) a second PAAM 504-2 directed towards (i.e., facing) the ceiling and (b) a third PAAM 504-3 directed towards (i.e., facing) the floor, as described above. As used herein, being "directed towards" or "facing" the ceiling means that the second PAAM 504-2 is directed at an angle that is upward relative to the desired bore sight angle of the first PAAM 504-1 such as, e.g., directed at an angle in the range of, e.g., 10° to 80° relative to the desired bore sight angle of the first PAAM 504-1, directed at an angle in the range of, e.g., 20° to 70° relative to the desired bore sight angle of the first PAAM 504-1, directed at an angle in the range of, e.g., 30° to 60° relative to the desired bore sight angle of the first PAAM 504-1, or directed at an angle in the range of, e.g., 40° to 50° relative to the desired bore sight angle of the first PAAM 504-1). As used herein, being "directed towards" or "facing" the floor means that the second PAAM 504-3 is directed at an angle that is downward relative to the desired bore sight angle of the first PAAM 504-1 such as, e.g., directed at an angle in the range of, e.g., −10° to −80° relative to the desired bore sight angle of the first PAAM 504-1, directed at an angle in the range of, e.g., −20° to −70° relative to the desired bore sight angle of the first PAAM 504-1, directed at an angle in the range of, e.g., −30° to −60° relative to the desired bore sight angle of the first PAAM 504-1, or directed at an angle in the range of, e.g., −40° to −50° relative to the desired bore sight angle of the first PAAM 504-1). Note that practical implementations of a PAAM today are limited to about ±15° for a 120° horizontal sector. Thus, in accordance with embodiments of the present disclosure, the added PAAMs are directed where there is the most use for them.

Note that the term "PAAM" is used herein only for reference. Other names may be used. For example, the PAAMs 504 may also be referred to herein as Advanced Antenna System (AASs) or simply an antenna system.

In some embodiments, each of the PAAMs 504 is implemented as one or more radio ASICs. The processing unit 502 is a baseband processing unit implemented as, e.g., one or more processors such as, e.g., one or more CPUs, one or more baseband ASICs, one or more Field Programmable Gate Arrays (FPGAs), or the like, or any combination thereof. Note that while there is a single processing unit 502 in this example, in other embodiments, the radio access node 500 may include a separate processing unit 502 for each of the PAAMs 504.

As discussed below in detail, each of the PAAMs 504 includes an antenna array. The antenna array includes many Antenna Elements (AEs). The PAAM 504 includes separate transmit branches (also referred to herein as transmit paths)

and separate receive branches (also referred to herein as receive paths) for each AE. As an example, each transmit branch includes a gain control element and a phase control element that are controlled by the processing unit 502 to provide gain and phase calibration between the transmit branches and, in some embodiments, analog beamforming for signals transmitted by the radio access node 500. Likewise, each receive branch includes a gain control element and a phase control element that are controlled by the processing unit 502 to provide gain and phase calibration between the receive branches, and in some embodiments, analog beamforming for signals received by the radio system 500.

Figure 6:
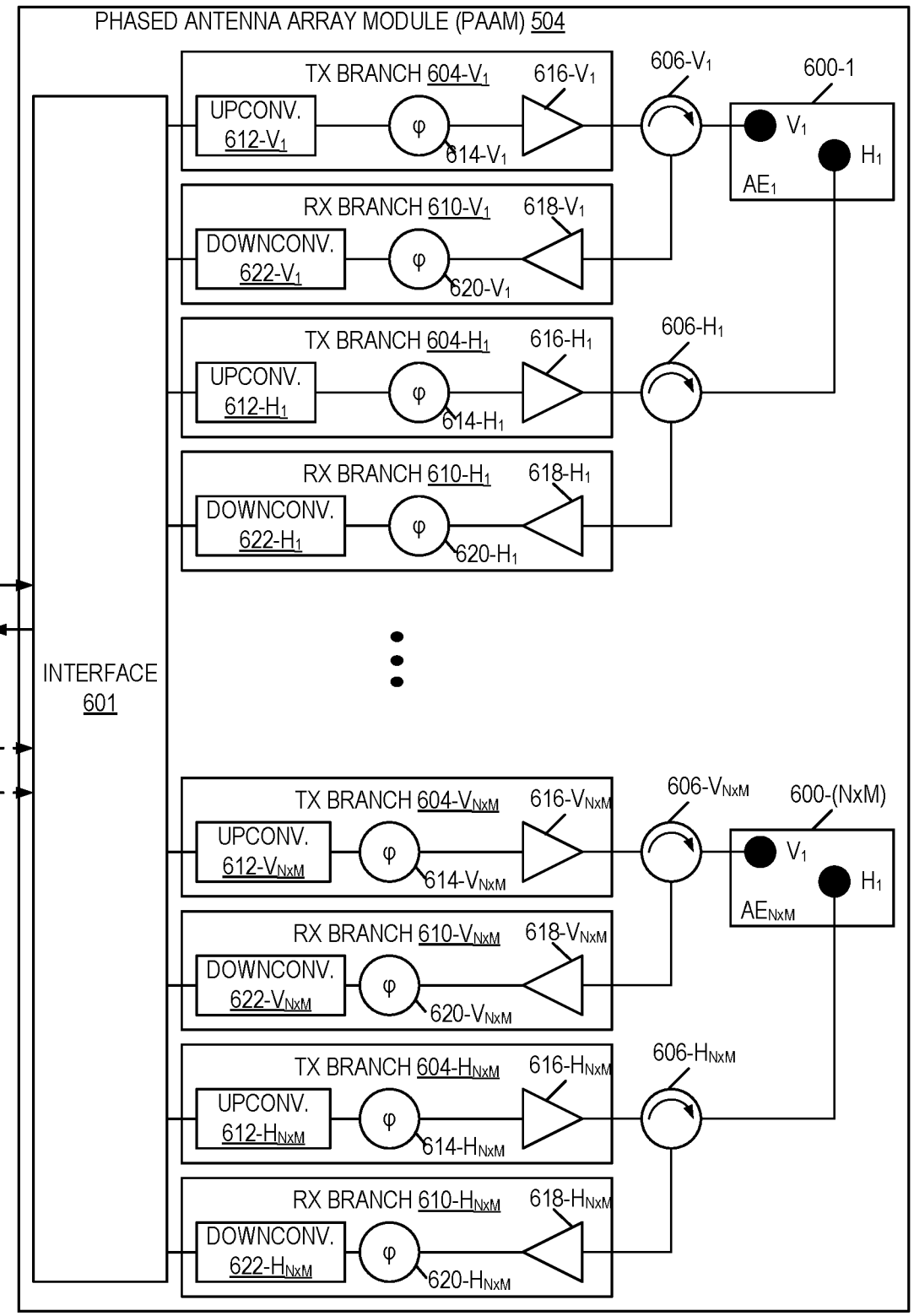
FIG. 6 illustrates one example of a PAAM.

FIG. 6 illustrates one example of a PAAM 504. This discussion is equally applicable to each of the PAAMs 504-1 through 504-P of FIG. 5. As illustrated in FIG. 6, the PAAM 504 is connected to the processing unit 502 via an interface 601. The PAM 504 includes AEs 600-1 through 600-(N×M), where N×M defines the dimensions of a two-dimensional (2D) matrix of AEs into which the AEs 600-1 through 600-(N×M) are arranged. In some preferred embodiments, N+M≥6. The AEs 600-1 through 600-(N×M) are generally referred to herein collectively as AEs 600 and individually as AE 600. In the illustrated example, each AE 600 has two polarizations, namely, a vertical polarization and a horizontal polarization having respective inputs. For example, the AE 600-1 has a first Input/Output (I/O) connection point ($V_1$) for the vertical polarization and a second I/O connection point ($H_1$) for the horizontal polarization.

In this example with two polarizations, for the vertical polarization of each i-th AE 600-$i$ (where i=1, 2, . . . , N×M), the PAAM 104 includes a transmit (TX) branch 604-$V_i$ coupled to the vertical I/O connection point ($V_i$) of the AE 600-$i$ via a circulator (duplexer or Rx-Tx switch), 606-$V_i$ for the transmit direction and a receive (RX) branch 610-$V_i$ coupled to the vertical I/O connection point ($V_i$) of the AE 600-$i$ via the circulator 606-$V_i$. The TX branch 604-$V_i$ includes upconversion circuitry 612-$V_i$, a phase adjustor, or phase control element, 614-$V_i$, and an amplifier, or gain control element, 616-$V_i$. While not illustrated, the phase adjustor 614-$V_i$ and the amplifier 616-$V_i$ are controlled by the processing unit 502 to thereby control the gain and phase of the TX branch 604-$V_i$. Similarly, the RX branch 610-$V_i$ includes an amplifier, or gain control element, 618-$V_i$, a phase adjustor, or phase control element, 620-$V_i$, and downconversion circuitry 622-$V_i$. While not illustrated, the amplifier 618-$V_i$ and the phase adjustor 620-$V_i$ are controlled by the processing unit 502 to thereby control the gain and phase of the RX branch 610-$V_i$.

For the horizontal polarization of each i-th AE 600-$i$ (where i=1, 2, . . . , N×M), the PAAM 104 includes a TX branch 604-$H_i$ coupled to the horizontal I/O connection point ($H_i$) of the AE 600-$i$ via a circulator, or duplexer, 606-$H_i$ for the transmit direction and a RX branch 610-$H_i$ coupled to the horizontal I/O connection point ($H_i$) of the AE 600-$i$ via the circulator 606-$H_i$. The TX branch 604-$H_i$ includes upconversion circuitry 612-$H_i$, a phase adjustor, or phase control element, 614-$H_i$, and an amplifier, or gain control element, 616-$H_i$. While not illustrated, the phase adjustor 614-$H_i$ and the amplifier 616-$H_i$ are controlled by the processing unit 502 to thereby control the gain and phase of the TX branch 604-$H_i$. Similarly, the RX branch 610-$H_i$ includes an amplifier, or gain control element, 618-$H_i$, a phase adjustor, or phase control element, 620-$H_i$, and downconversion circuitry 622-$H_i$. While not illustrated, the amplifier 618-$H_i$ and the phase adjustor 620-$H_i$ are controlled by the processing unit 502 to thereby control the gain and phase of the RX branch 610-$H_i$.

Notably, when an AE 600-$i$ is configured for TX (i.e., coupled to the TX branch 604-$V_i$ and/or the TX branch 604-$H_i$), the AE 600-$i$ is referred to herein as a "TX AE" or "transmit AE." Conversely, when an AE 600-$i$ is configured for RX (i.e., coupled to the RX branch 610-$V_i$ and/or the RX branch 610-$H_i$), the AE 600-$i$ is referred to herein as a "RX AE" or "receive AE."

Figure 7:
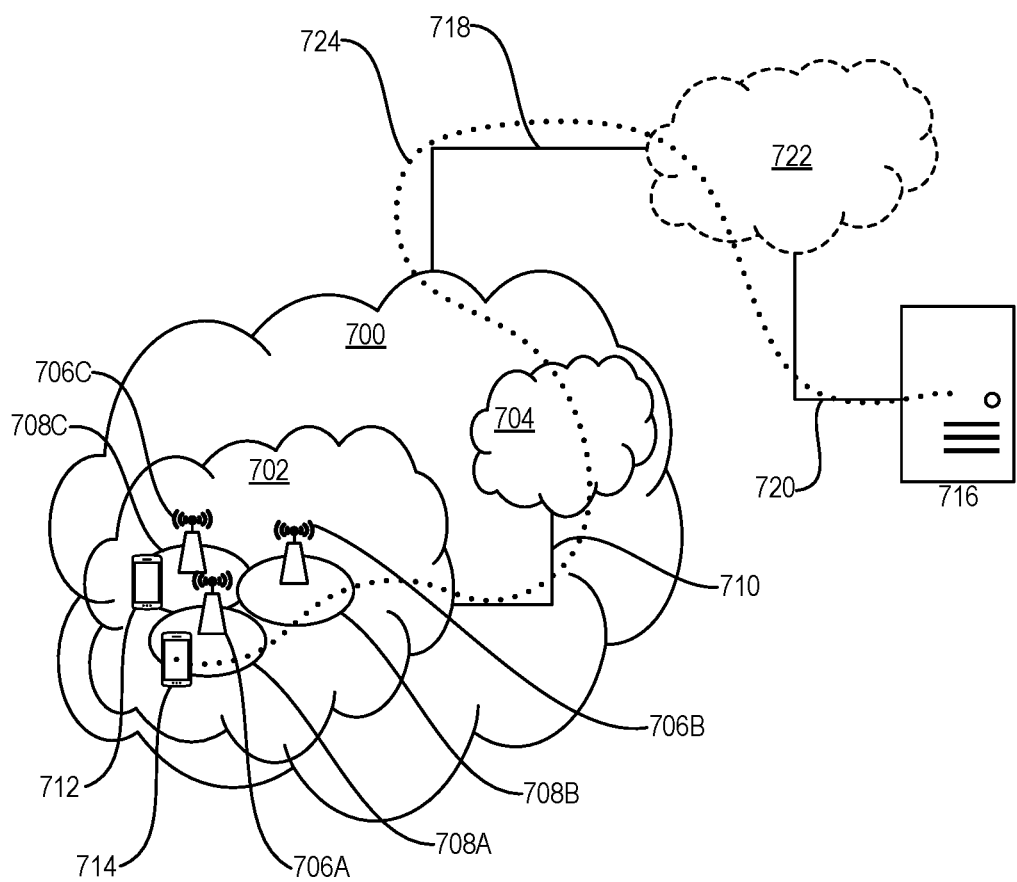
FIG. 7 illustrates another example of a communication system in which embodiments of the present disclosure may be implemented.

With reference to FIG. 7, in accordance with an embodiment, a communication system includes a telecommunication network 700, such as a 3GPP-type cellular network, which comprises an access network 702, such as a RAN, and a core network 704. The access network 702 comprises a plurality of base stations 706A, 706B, 706C, such as Node Bs, eNBs, gNBs, or other types of wireless Access Points (APs), each defining a corresponding coverage area 708A, 708B, 708C. Each base station 706A, 706B, 706C is connectable to the core network 704 over a wired or wireless connection 710. A first UE 712 located in coverage area 708C is configured to wirelessly connect to, or be paged by, the corresponding base station 706C. A second UE 714 in coverage area 708A is wirelessly connectable to the corresponding base station 706A. While a plurality of UEs 712, 714 are illustrated in this example, the disclosed embodiments are equally applicable to a situation where a sole UE is in the coverage area or where a sole UE is connecting to the corresponding base station 706.

The telecommunication network 700 is itself connected to a host computer 716, which may be embodied in the hardware and/or software of a standalone server, a cloud-implemented server, a distributed server, or as processing resources in a server farm. The host computer 716 may be under the ownership or control of a service provider, or may be operated by the service provider or on behalf of the service provider. Connections 718 and 720 between the telecommunication network 700 and the host computer 716 may extend directly from the core network 704 to the host computer 716 or may go via an optional intermediate network 722. The intermediate network 722 may be one of, or a combination of more than one of, a public, private, or hosted network; the intermediate network 722, if any, may be a backbone network or the Internet; in particular, the intermediate network 722 may comprise two or more sub-networks (not shown).

The communication system of FIG. 7 as a whole enables connectivity between the connected UEs 712, 714 and the host computer 716. The connectivity may be described as an Over-the-Top (OTT) connection 724. The host computer 716 and the connected UEs 712, 714 are configured to communicate data and/or signaling via the OTT connection 724, using the access network 702, the core network 704, any intermediate network 722, and possible further infrastructure (not shown) as intermediaries. The OTT connection 724 may be transparent in the sense that the participating communication devices through which the OTT connection 724 passes are unaware of routing of uplink and downlink communications. For example, the base station 706 may not or need not be informed about the past routing of an incoming downlink communication with data originating from the host computer 716 to be forwarded (e.g., handed over) to a connected UE 712. Similarly, the base station 706 need not be aware of the future routing of an outgoing uplink communication originating from the UE 712 towards the host computer 716.

Example implementations, in accordance with an embodiment, of the UE, base station, and host computer discussed in the preceding paragraphs will now be described with reference to FIG. 8. In a communication system 800, a host computer 802 comprises hardware 804 including a communication interface 806 configured to set up and maintain a wired or wireless connection with an interface of a different communication device of the communication system 800. The host computer 802 further comprises processing circuitry 808, which may have storage and/or processing capabilities. In particular, the processing circuitry 808 may comprise one or more programmable processors, ASICs, FPGAs, or combinations of these (not shown) adapted to execute instructions. The host computer 802 further comprises software 810, which is stored in or accessible by the host computer 802 and executable by the processing circuitry 808. The software 810 includes a host application 812. The host application 812 may be operable to provide a service to a remote user, such as a UE 814 connecting via an OTT connection 816 terminating at the UE 814 and the host computer 802. In providing the service to the remote user, the host application 812 may provide user data which is transmitted using the OTT connection 816.

The communication system 800 further includes a base station 818 provided in a telecommunication system and comprising hardware 820 enabling it to communicate with the host computer 802 and with the UE 814. The hardware 820 may include a communication interface 822 for setting up and maintaining a wired or wireless connection with an interface of a different communication device of the communication system 800, as well as a radio interface 824 for setting up and maintaining at least a wireless connection 826 with the UE 814 located in a coverage area (not shown in FIG. 8) served by the base station 818. The communication interface 822 may be configured to facilitate a connection 828 to the host computer 802. The connection 828 may be direct or it may pass through a core network (not shown in FIG. 8) of the telecommunication system and/or through one or more intermediate networks outside the telecommunication system. In the embodiment shown, the hardware 820 of the base station 818 further includes processing circuitry 830, which may comprise one or more programmable processors, ASICs, FPGAs, or combinations of these (not shown) adapted to execute instructions. The base station 818 further has software 832 stored internally or accessible via an external connection.

The communication system 800 further includes the UE 814 already referred to. The UE's 814 hardware 834 may include a radio interface 836 configured to set up and maintain a wireless connection 826 with a base station serving a coverage area in which the UE 814 is currently located. The hardware 834 of the UE 814 further includes processing circuitry 838, which may comprise one or more programmable processors, ASICs, FPGAs, or combinations of these (not shown) adapted to execute instructions. The UE 814 further comprises software 840, which is stored in or accessible by the UE 814 and executable by the processing circuitry 838. The software 840 includes a client application 842. The client application 842 may be operable to provide a service to a human or non-human user via the UE 814, with the support of the host computer 802.

In the host computer 802, the executing host application 812 may communicate with the executing client application 842 via the OTT connection 816 terminating at the UE 814 and the host computer 802. In providing the service to the user, the client application 842 may receive request data from the host application 812 and provide user data in response to the request data. The OTT connection 816 may transfer both the request data and the user data. The client application 842 may interact with the user to generate the user data that it provides.

Figure 8:
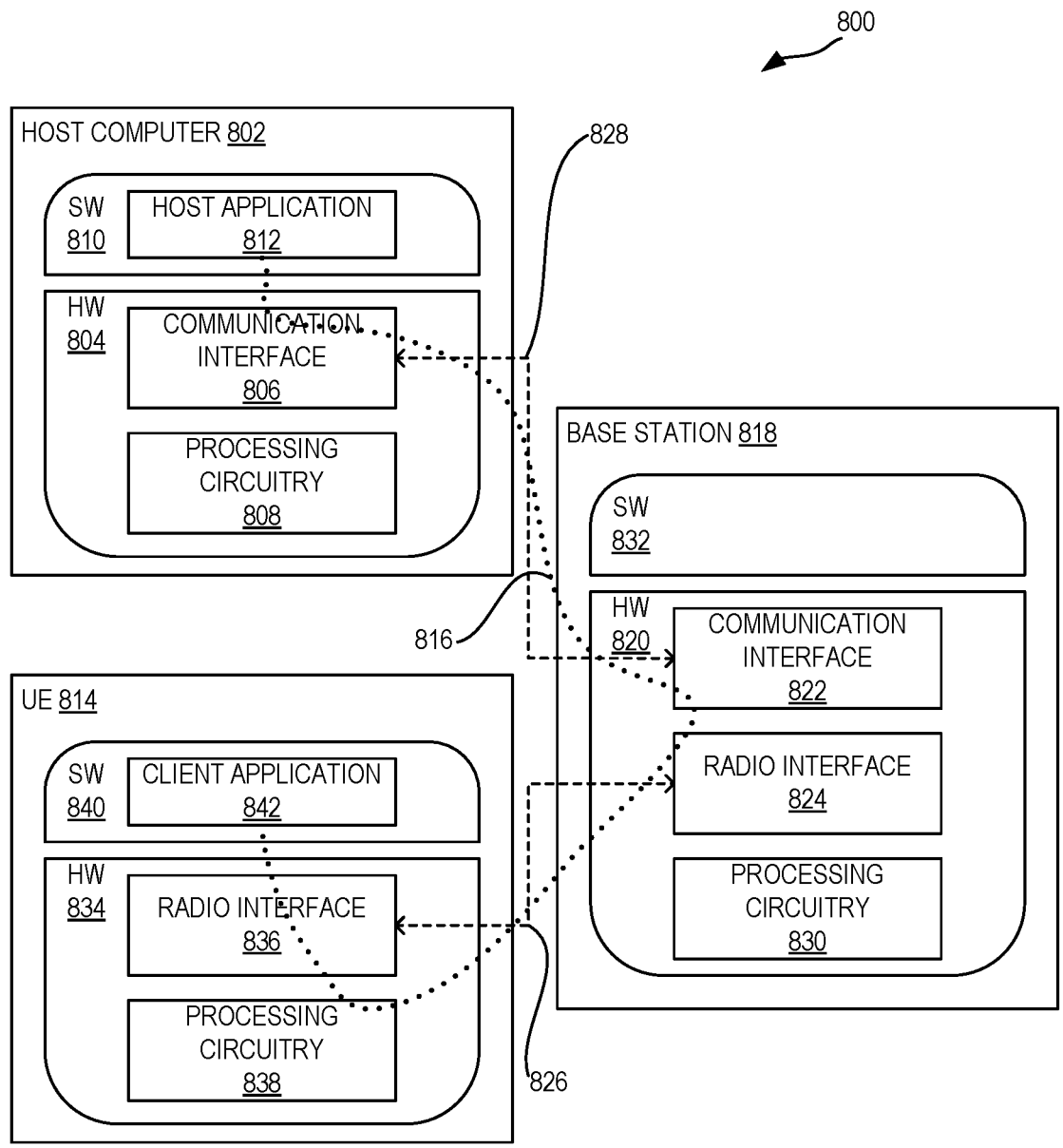
FIG. 8 illustrates the host computer, base station, and UE of FIG. 7 in more detail, in accordance with an embodiment of the present disclosure.

It is noted that the host computer 802, the base station 818, and the UE 814 illustrated in FIG. 8 may be similar or identical to the host computer 716, one of the base stations 706A, 706B, 706C, and one of the UEs 712, 714 of FIG. 7, respectively.

This is to say, the inner workings of these entities may be as shown in FIG. 8 and independently, the surrounding network topology may be that of FIG. 7.

In FIG. 8, the OTT connection 816 has been drawn abstractly to illustrate the communication between the host computer 802 and the UE 814 via the base station 818 without explicit reference to any intermediary devices and the precise routing of messages via these devices. The network infrastructure may determine the routing, which may be configured to hide from the UE 814 or from the service provider operating the host computer 802, or both. While the OTT connection 816 is active, the network infrastructure may further take decisions by which it dynamically changes the routing (e.g., on the basis of load balancing consideration or reconfiguration of the network).

The wireless connection 826 between the UE 814 and the base station 818 is in accordance with the teachings of the embodiments described throughout this disclosure. One or more of the various embodiments improve the performance of OTT services provided to the UE 814 using the OTT connection 816, in which the wireless connection 826 forms the last segment. More precisely, the teachings of these embodiments may improve, e.g., data rate and thereby provide benefits such as, e.g., reduced user waiting time.

A measurement procedure may be provided for the purpose of monitoring data rate, latency, and other factors on which the one or more embodiments improve. There may further be an optional network functionality for reconfiguring the OTT connection 816 between the host computer 802 and the UE 814, in response to variations in the measurement results. The measurement procedure and/or the network functionality for reconfiguring the OTT connection 816 may be implemented in the software 810 and the hardware 804 of the host computer 802 or in the software 840 and the hardware 834 of the UE 814, or both. In some embodiments, sensors (not shown) may be deployed in or in association with communication devices through which the OTT connection 816 passes; the sensors may participate in the measurement procedure by supplying values of the monitored quantities exemplified above, or supplying values of other physical quantities from which the software 810, 840 may compute or estimate the monitored quantities. The reconfiguring of the OTT connection 816 may include message format, retransmission settings, preferred routing, etc.; the reconfiguring need not affect the base station 818, and it may be unknown or imperceptible to the base station 818. Such procedures and functionalities may be known and practiced in the art. In certain embodiments, measurements may involve proprietary UE signaling facilitating the host computer 802's measurements of throughput, propagation times, latency, and the like. The measurements may be implemented in that the software 810 and 840 causes messages to be transmitted, in particular empty or 'dummy' messages, using the OTT connection 816 while it monitors propagation times, errors, etc.

FIG. 9 is a flowchart illustrating a method implemented in a communication system, in accordance with one embodiment. The communication system includes a host computer, a base station, and a UE which may be those described with reference to FIGS. 7 and 8. For simplicity of the present disclosure, only drawing references to FIG. 9 will be included in this section. In step 900, the host computer provides user data. In sub-step 902 (which may be optional) of step 900, the host computer provides the user data by executing a host application. In step 904, the host computer initiates a transmission carrying the user data to the UE. In step 906 (which may be optional), the base station transmits to the UE the user data which was carried in the transmission that the host computer initiated, in accordance with the teachings of the embodiments described throughout this disclosure. In step 908 (which may also be optional), the UE executes a client application associated with the host application executed by the host computer.

FIG. 10 is a flowchart illustrating a method implemented in a communication system, in accordance with one embodiment. The communication system includes a host computer, a base station, and a UE which may be those described with reference to FIGS. 7 and 8. For simplicity of the present disclosure, only drawing references to FIG. 10 will be included in this section. In step 1000 of the method, the host computer provides user data. In an optional sub-step (not shown) the host computer provides the user data by executing a host application. In step 1002, the host computer initiates a transmission carrying the user data to the UE. The transmission may pass via the base station, in accordance with the teachings of the embodiments described throughout this disclosure. In step 1004 (which may be optional), the UE receives the user data carried in the transmission.

FIG. 11 is a flowchart illustrating a method implemented in a communication system, in accordance with one embodiment. The communication system includes a host computer, a base station, and a UE which may be those described with reference to FIGS. 7 and 8. For simplicity of the present disclosure, only drawing references to FIG. 11 will be included in this section. In step 1100 (which may be optional), the UE receives input data provided by the host computer. Additionally or alternatively, in step 1102, the UE provides user data. In sub-step 1104 (which may be optional) of step 1100, the UE provides the user data by executing a client application. In sub-step 1106 (which may be optional) of step 1102, the UE executes a client application which provides the user data in reaction to the received input data provided by the host computer. In providing the user data, the executed client application may further consider user input received from the user. Regardless of the specific manner in which the user data was provided, the UE initiates, in sub-step 1108 (which may be optional), transmission of the user data to the host computer. In step 1110 of the method, the host computer receives the user data transmitted from the UE, in accordance with the teachings of the embodiments described throughout this disclosure.

FIG. 12 is a flowchart illustrating a method implemented in a communication system, in accordance with one embodiment. The communication system includes a host computer, a base station, and a UE which may be those described with reference to FIGS. 7 and 8. For simplicity of the present disclosure, only drawing references to FIG. 12 will be included in this section. In step 1200 (which may be optional), in accordance with the teachings of the embodiments described throughout this disclosure, the base station receives user data from the UE.

In step 1202 (which may be optional), the base station initiates transmission of the received user data to the host computer. In step 1204 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows:

Embodiment 1: A radio access node (500, 102, 106) for a cellular communications system, comprising: one or more antenna systems (504-1 through 504-P) comprising a first antenna system (504-1) directed at a desired bore sight angle and either or both of a second antenna system (504-2) directed upwards relative to the desired bore sight angle of the first antenna system (504-1) and a second antenna system (504-3) directed downwards relative to the desired bore sign angle of the first antenna system (504-1).

Embodiment 2: The radio access node (500, 102, 106) of embodiment 1 further comprising one or more processing units (502) configured to control the one or more antenna systems (504-1 through 504-P) in accordance with a MIMO scheme.

Embodiment 3: The radio access node (500, 102, 106) of embodiment 1 further comprising one or more processing units (502) configured to control the one or more antenna systems (504-1 through 504-P) in accordance with a SU-MIMO scheme.

Embodiment 4: The radio access node (500, 102, 106) of any one of embodiments 1 to 3 wherein each antenna system (504) of the one or more antenna systems (504-1 through 504-P) comprises a respective antenna array comprising a plurality of antenna elements.

Embodiment 5: The radio access node (500, 102, 106) of any one of embodiments 1 to 4 wherein the one or more antenna systems (504-1 through 504-P) comprise the second antenna system (504-2), and the second antenna system (504-2) is directed upwards at an angle in a range of and including 10° to 80°, relative to the desired bore sight angle of the first antenna system (504-1).

Embodiment 6: The radio access node (500, 102, 106) of any one of embodiments 1 to 4 wherein the one or more antenna systems (504-1 through 504-P) comprise the second antenna system (504-2), and the second antenna system (504-2) is directed upwards at an angle in a range of and including 20° to 70°, relative to the desired bore sight angle of the first antenna system (504-1).

Embodiment 7: The radio access node (500, 102, 106) of any one of embodiments 1 to 4 wherein the one or more antenna systems (504-1 through 504-P) comprise the second antenna system (504-2), and the second antenna system (504-2) is directed upwards at an angle in a range of and including 30° to 60°, relative to the desired bore sight angle of the first antenna system (504-1).

Embodiment 8: The radio access node (500, 102, 106) of any one of embodiments 1 to 4 wherein the one or more antenna systems (504-1 through 504-P) comprise the second antenna system (504-2), and the second antenna system (504-2) is directed upwards at an angle in a range of and including 40° to 50°, relative to the desired bore sight angle of the first antenna system (504-1).

Embodiment 9: The radio access node (500, 102, 106) of any one of embodiments 1 to 8 wherein the one or more antenna systems (504-1 through 504-P) comprise the third antenna system (504-3), and the third antenna system (504-3) is directed downwards at an angle in a range of and including −10° to −80°, relative to the desired bore sight angle of the first antenna system (504-1).

Embodiment 10: The radio access node (500, 102, 106) of any one of embodiments 1 to 8 wherein the one or more antenna systems (504-1 through 504-P) comprise the third antenna system (504-3), and the third antenna system (504-3) is directed downwards at an angle in a range of and including −20° to −70°, relative to the desired bore sight angle of the first antenna system (504-1).

Embodiment 11: The radio access node (500, 102, 106) of any one of embodiments 1 to 8 wherein the one or more antenna systems (504-1 through 504-P) comprise the third antenna system (504-3), and the third antenna system (504-3) is directed downwards at an angle in a range of and including −30° to −60°, relative to the desired bore sight angle of the first antenna system (504-1).

Embodiment 12: The radio access node (500, 102, 106) of any one of embodiments 1 to 8 wherein the one or more antenna systems (504-1 through 504-P) comprise the third antenna system (504-3), and the third antenna system (504-3) is directed downwards at an angle in a range of and including −40° to −50°, relative to the desired bore sight angle of the first antenna system (504-1).

Embodiment 13: The radio access node (500, 102, 106) of any one of embodiments 1 to 12 wherein the radio access node (500, 102, 106) is an indoor radio access node.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
AF Application Function
AMF Access and Mobility Function
AN Access Network
AP Access Point
ASIC Application Specific Integrated Circuit
AUSF Authentication Server Function
CPU Central Processing Unit
DN Data Network
DSP Digital Signal Processor
eNB Enhanced or Evolved Node B
EPS Evolved Packet System
E-UTRA Evolved Universal Terrestrial Radio Access
FPGA Field Programmable Gate Array
gNB New Radio Base Station
gNB-DU New Radio Base Station Distributed Unit
HSS Home Subscriber Server
IoT Internet of Things
IP Internet Protocol
LTE Long Term Evolution
MME Mobility Management Entity
MTC Machine Type Communication
NEF Network Exposure Function
NF Network Function
NR New Radio
NRF Network Function Repository Function
NSSF Network Slice Selection Function
OTT Over-the-Top
PC Personal Computer
PCF Policy Control Function
P-GW Packet Data Network Gateway
QoS Quality of Service
RAM Random Access Memory
RAN Radio Access Network
ROM Read Only Memory
RRH Remote Radio Head
RTT Round Trip Time
SCEF Service Capability Exposure Function
SMF Session Management Function
UDM Unified Data Management
UE User Equipment
UPF User Plane Function Those skilled in the art will recognize improvements and modifications to the embodiments of the present disclosure. All such improvements and modifications are considered within the scope of the concepts disclosed herein.

What is claimed is:

1. A radio access node for a cellular communications system, comprising:
one or more antenna systems comprising:
a first antenna system directed at a desired bore sight angle; and
either or both of:
a second antenna system directed upwards relative to the desired bore sight angle of the first antenna system, wherein the second antenna system is directed towards a ceiling of an indoor environment; and
a second antenna system directed downwards relative to the desired bore sight angle of the first antenna system, wherein the second antenna system is directed towards a floor of the indoor environment,
wherein each antenna system of the one or more antenna systems comprises a respective antenna array comprising a plurality of antenna elements,
wherein each of the plurality of antenna elements has a vertical polarization and a horizontal polarization, and
wherein each of the antenna element has a first Input/Output (I/O) connection point for the vertical polarization and a second I/O connection point for the horizontal polarization.

2. The radio access node of claim 1, further comprising one or more processing units configured to control the one or more antenna systems in accordance with a Multiple Input Multiple Output (MIMO) scheme.

3. The radio access node of claim 1, further comprising one or more processing units configured to control the one or more antenna systems in accordance with a Single User Multiple Input Multiple Output (SU-MIMO) scheme.

4. The radio access node of claim 1, wherein the one or more antenna systems comprise the second antenna system, and the second antenna system is directed upwards at an angle in a range of and including 10° to 80°, relative to the desired bore sight angle of the first antenna system.

5. The radio access node of claim 1, wherein the one or more antenna systems comprise the second antenna system, and the second antenna system is directed upwards at an angle in a range of and including 20° to 70°, relative to the desired bore sight angle of the first antenna system.

6. The radio access node of claim 1, wherein the one or more antenna systems comprise the second antenna system, and the second antenna system is directed upwards at an angle in a range of and including 30° to 60°, relative to the desired bore sight angle of the first antenna system.

7. The radio access node of claim 1, wherein the one or more antenna systems comprise the second antenna system, and the second antenna system is directed upwards at an angle in a range of and including 40° to 50°, relative to the desired bore sight angle of the first antenna system.

8. The radio access node of claim 1, wherein the one or more antenna systems comprise a third antenna system, and the third antenna system is directed downwards at an angle in a range of and including −10° to −80°, relative to the desired bore sight angle of the first antenna system.

9. The radio access node of claim 1, wherein the one or more antenna systems comprise a third antenna system, and the third antenna system is directed downwards at an angle in a range of and including −20° to −70°, relative to the desired bore sight angle of the first antenna system.

10. The radio access node of claim 1, wherein the one or more antenna systems comprise a third antenna system, and the third antenna system is directed downwards at an angle in a range of and including −30° to −60°, relative to the desired bore sight angle of the first antenna system.

11. The radio access node of claim 1, wherein the one or more antenna systems comprise a third antenna system, and the third antenna system is directed downwards at an angle in a range of and including −40° to −50°, relative to the desired bore sight angle of the first antenna system.

12. The radio access node of claim 1, wherein the radio access node is an indoor radio access node.

* * * * *